United States Patent [19]
Mrozowski et al.

[11] Patent Number: 5,183,192
[45] Date of Patent: Feb. 2, 1993

[54] SPARE TIRE LOWERING SYSTEM

[75] Inventors: Joseph E. Mrozowski, Del Mar; Jeffery K. Fusco, La Jolla; Alfonso Albaisa, San Diego, all of Calif.

[73] Assignee: Nissan Design International, Inc., San Diego, Calif.

[21] Appl. No.: 735,880

[22] Filed: Jul. 25, 1991

[51] Int. Cl.$^5$ .............................................. B62D 43/00
[52] U.S. Cl. ................... 224/42.21; 224/42.24
[58] Field of Search ............... 224/42.21, 42.24, 42.28, 224/42.3; 414/465, 466

[56] References Cited

U.S. PATENT DOCUMENTS

| | | | |
|---|---|---|---|
| 1,597,693 | 8/1926 | Ragsdale | 224/42.24 |
| 3,387,754 | 6/1968 | Sinkey et al. | 224/42.21 |
| 3,593,898 | 7/1971 | DiForte | 224/42.24 |
| 4,386,722 | 6/1983 | Gearhart | 224/42.24 |
| 4,717,054 | 1/1988 | VanZant | 224/42.21 |
| 4,915,274 | 4/1990 | Oliver | 224/42.24 |
| 5,020,707 | 6/1991 | Nozel et al. | 224/42.21 |

FOREIGN PATENT DOCUMENTS 556076  4/1977  U.S.S.R. .......................... 224/42.21

Primary Examiner—Linda J. Sholl
Attorney, Agent, or Firm—Baker, Maxham, Jester & Meador

[57] ABSTRACT

A primary rack and a secondary rack are connected to each other and are independently rotatably about vertical and horizontal axes, respectively. One end of the primary rack is mounted via hinge assemblies to the rear corner of a body of the utility vehicle. The secondary rack rack is hingedly mounted to the primary rack. The secondary rack carries a hub over which the wheel of a spare tire can mounted and secured. The secondary rack can be rotated through approximately 180 degrees between a raised configuration in which the spare tire is elevated off of a road surface on which the vehicle rests and a lowered configuration in which the spare tire also rests on the road surface.

9 Claims, 1 Drawing Sheet

SPARE TIRE LOWERING SYSTEM

BACKGROUND OF THE INVENTION

The present invention relates to motor vehicles, and in particular, to auxiliary mounting devices for mounting spare tires on the exterior of automobiles.

Currently there is a class of automobile known as a utility vehicle that typically includes seating for five passengers along with an interior cargo bay in the rear of the vehicle. A typical utility vehicle has four wheel drive. The rear bench seat may be folded or removed to increase the length of the cargo bay. Because such a vehicle has no trunk the spare tire, comprising a tire mounted on a rim, must be stowed elsewhere. Usually there is insufficient room or clearance beneath the frame of the vehicle to stow the spare tire. In some models the spare tire is stored in the cargo bay adjacent the sidewall of the vehicle. This arrangement unnecessarily limits the usable cargo space. Also, the driver must manually lift the spare tire out of the cargo bay. Due to the significant size and weight of the spare tire, this can be a difficult task which can lead to back injuries. Because of this, auxiliary spare tire mounting brackets have been developed which mount to the exterior of one of the rear corners of the vehicle body. They can swing out to provide clearance for opening the tailgate. However, the driver must still lift the spare tire to the ground and lift the tire being replaced back to the mounting bracket.

U.S. Pat. Nos. 3,610,658 of Satori and 3,613,971 of Betz disclose a single rack pivotally connected to the bumper for supporting a spare tire. U.S. Pat. No. 3,669,326 of Podraza discloses a pivoting arm rotatable about a horizontal axis for supporting a spare tire. U.S. Pat. No. 4,418,851 of Ankeny discloses a pair of arms pivotally connected to each other and attached to the bumper and tailgate for pivoting a spare tire. U.S. Pat. No. 4,327,848 of Weiler discloses a pivoting channel member for supporting a spare tire. Finally, U.S. Pat. No. 4,561,575 of Jones discloses an upright arm connected to a trailer hitch for supporting a spare tire.

None of the foregoing patented spare tire mounting systems is advantageously suited to the type of utility vehicle described above.

SUMMARY OF THE INVENTION

It is therefore the primary object of the present invention to provide an improved spare tire mounting system.

It is another object of the present invention to provide a spare mounting system that is adapted for a utility vehicle.

Another object of the present invention is to provide a spare tire mounting system which will readily permit a driver to unload a spare tire.

Another object of the present invention is to provide a spare tire mounting system which will readily permit a driver to load a flat tire for transport.

Another object of the present invention is to provide a spare tire mounting rack which will readily mount to the exterior of a utility vehicle, can be swung out of the way of the tail gate and will permit easy and rapid raising and lowering of a tire mounted to the bracket.

According to the illustrated embodiment of the present invention, a spare tire lowering system for a utility vehicle includes a primary rack and a secondary rack which are connected to each other and are independently rotatably about vertical and horizontal axes, respectively. One end of the primary rack is mounted via hinge assemblies to the rear corner of a body of the utility vehicle. The secondary rack rack is hingedly mounted to the primary rack. The secondary rack carries a hub over which the wheel of a spare tire can mounted and secured. The secondary rack can be rotated through approximately 180 degrees between a raised configuration in which the spare tire is elevated off of a road surface on which the vehicle rests and a lowered configuration in which the spare tire also rests on the road surface.

DESCRIPTION OF THE PREFERRED EMBODIMENT

Figure 1:
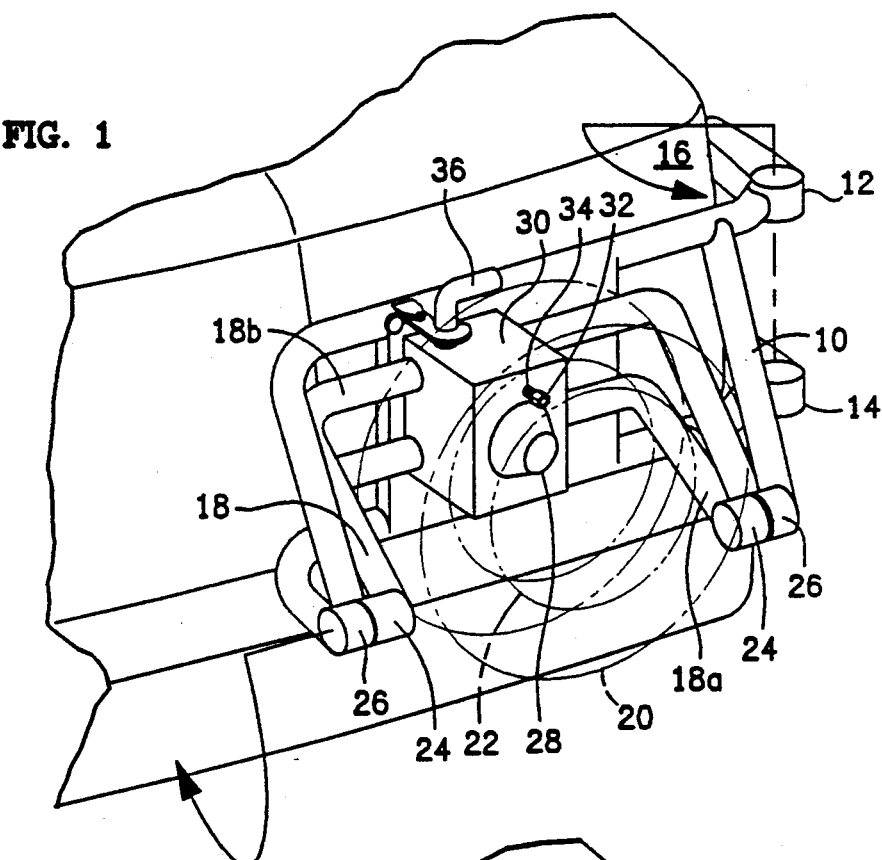
FIG. 1 is a perspective view of a preferred embodiment of the spare tire loading system of the present invention illustrated in its raised (stowed) configuration on the rear of a utility vehicle.

Referring to FIG. 1 of the drawings, a preferred embodiment of my spare tire lowering system is illustrated in its upright, stowed configuration. The system includes a primary rack 10 having one end connected via upper and lower hinge assemblies 12 and 14 to the right rear corner 16 of the body of a utility vehicle. The primary rack can thus rotate about a substantially vertical axis. A secondary rack 18 carries a spare tire 20 illustrated in phantom lines. The spare tire includes a rim 22 also illustrated in phantom lines. The secondary rack and spare tire are pivotable about a horizontal axis defined by bearings 24 on the secondary rack. The bearings are journaled or otherwise connected to bearings 26 carried by the primary rack 10.

Figure 2:
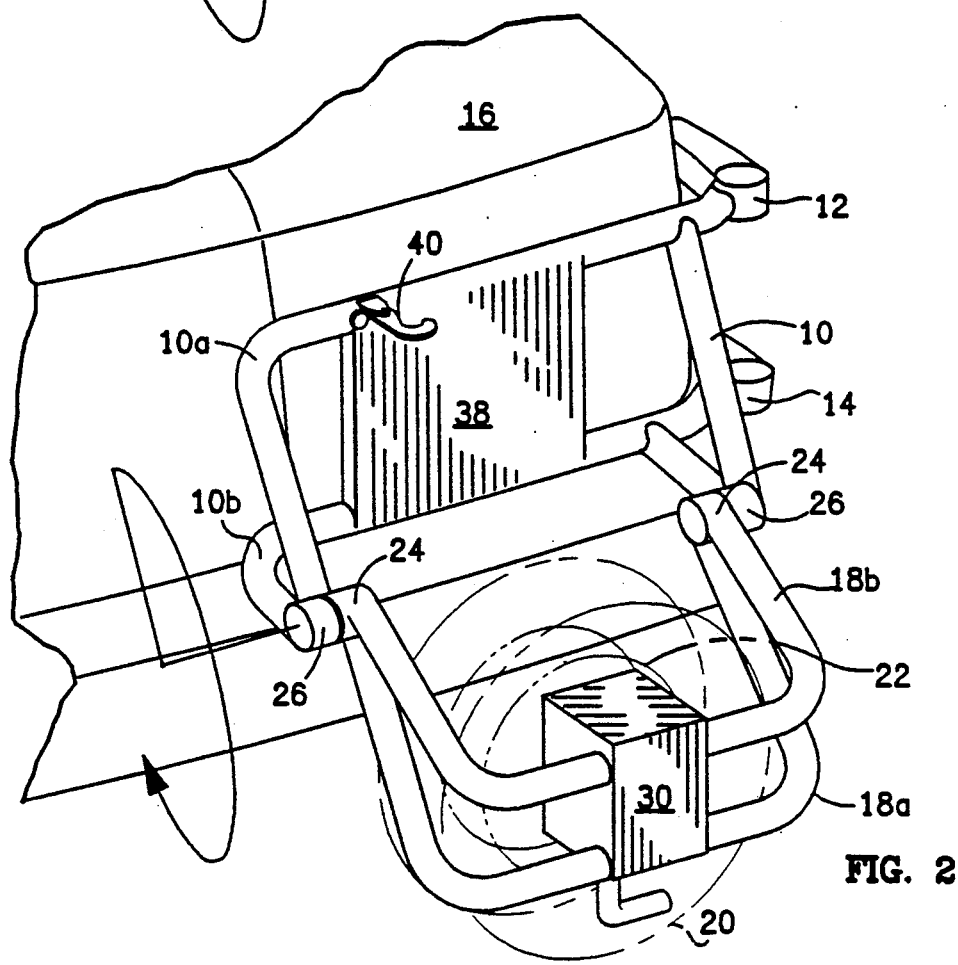
FIG. 2 is a perspective view of the preferred embodiment of the spare tire loading system of the present invention illustrated in its lowered configuration on the rear of a utility vehicle ready for removal of the spare tire.

The hole in the center of the rim 22 is mounted over a frusto-conical hub 28 that projects from a mounting box 30. This box connects the intermediate segments of two angularly disposed U-shaped members 18a and 18b of the secondary rack. A lock nut 32 secures the rim to a threaded shaft 34 that also projects from the mounting box 30. A person may grip a handle 36 connected to the mounting box 30 and swing the secondary rack 18 to its lowered configuration illustrated in FIG. 2 at which time the spare tire rests on the road surface and can be removed. The spare tire is rotated through an angle of approximately 180 degrees as indicated by the arrow in FIG. 2.

The primary rack 10 includes two angularly disposed U-shaped members 10a and 10b (FIG. 2) which are connected by a support panel 38. A manually actuated latch 40 is connected to the panel. This latch is provided for holding the handle 36 to secure the secondary rack in its raised configuration.

The bearing assemblies 24 or 26 may be provided with integral strong torsion springs (not illustrated) which urge the secondary rack 18 toward its raised configuration. This prevents the rack from slamming the spare tire down on the pavement. They also assist the driver in raising the secondary rack when the replaced tire has been loaded thereon. Alternatively, a pneumatic assist device may be utilized to perform the upward biasing function.

The primary and secondary racks may be manufactured from welded steel tubing. The mounting box 30 and support panel 38 may be fabricated from sheet metal.

While we have described a preferred embodiment of our spare tire lowering system, it should be understood that modifications and adaptations thereof will occur to persons skilled in the art. Therefore, the protection afforded our invention should only be limited in accordance with the scope of the following claims.

We claim:

1. A spare tire lowering system for a vehicle, comprising:
    a primary rack including a first pair of generally U-shaped members each having an intermediate portion and first and second leg portions extending from opposite ends of the intermediate portion, the intermediate portions being spaced apart and generally parallel; said first leg portions converging together to form a first terminal end and said second leg portions covering together to form a second terminal end;
    means for mounting an end of the primary rack to a rear corner of a body of the vehicle so that the primary rack can pivot about a substantially vertical axis;
    a secondary rack including a second pair of generally U-shaped members each having an intermediate portion and third and fourth leg portions extending from opposite ends of the intermediate portion, the intermediate portions being spaced apart and generally parallel; said third leg portions converging together to form a third terminal end and said fourth leg portions converging together to form a fourth terminal end;
    hub means connected between the intermediate portions of the U-shaped members of the secondary rack for having a wheel of a spare tire mounted over the same;
    means for releasably holding the wheel of the spare time over the hub means; and
    means for hingedly connecting at least one of said third and fourth terminal ends of the U-shaped members of the secondary rack to at least one of said first and second terminal ends of the U-shaped members of the primary rack for enabling rotation of the secondary rack about a substantially horizontal axis between a raised configuration in which the spare tire is elevated off of a road surface on which the vehicle rests and a lowered configuration in which the spare tire also rests on the road surface.

2. A spare tire lowering system according to claim 1 wherein the tire is rotated through approximately 180 degrees when the secondary rack is rotated between its raised and lowered configurations.

3. A spare tire lowering system according to claim 1 and further comprising manually releasable latch means for connecting the primary and secondary racks to hold the secondary rack in its raised configuration.

4. A spare tire lowering system according to claim 1 wherein the hub means includes a frusto-conical hub.

5. A spare tire lowering system according to claim 1 wherein the means for releasably holding the wheel of the spare tire over the hub means includes a lock nut that screws over a threaded shaft.

6. A spare tire lowering system according to claim 1 wherein the primary rack includes a support panel connected between the intermediate portions of the U-shaped members of the primary rack.

7. A spare tire lowering system according to claim 1 wherein the secondary rack further includes a mounting box connected between the intermediate portions of the U-shaped members of the secondary rack for carrying the hub means.

8. A spare tire lowering system according to claim 1 wherein the U-shaped members of the secondary rack rotate between the leg portions of the U-shaped members of the primary rack.

9. A spare tire lowering system for a vehicle, comprising:
    a primary rack including a first pair of generally U-shaped members each having an intermediate portion and first and second leg portions extending from opposite ends of the intermediate portion, the intermediate portions being spaced apart and generally parallel; said first leg portions converging together to form a first terminal end and said second leg portions covering together to form a second terminal end, and a support panel connected between the intermediate portions;
    means for mounting an end of the primary rack to a rear corner of a body of the vehicle so that the primary rack can pivot about a substantially vertical axis;
    a secondary rack including a second pair of generally U-shaped members each having an intermediate portion and third and fourth leg portions extending from opposite ends of the intermediate portion, the intermediate portions being spaced apart and generally parallel; said third leg portions converging together to form a third terminal end and said fourth leg portions converging together to form a fourth terminal end;
    hub means including a mounting box connected between the intermediate portions of the U-shaped members of the secondary rack for having a wheel of a spare tire mounted over the same;
    means for releasably holding the wheel of the spare time over the hub means;
    a handle connected to the mounting box;
    latch means mounted on the support panel for releasably engaging the handle; and means for hingedly connecting at least one of said third and fourth terminal ends of the U-shaped members of the secondary rack to at least one of said first and second terminal ends of the U-shaped members of the primary rack for enabling rotation of the secondary rack about a substantially horizontal axis between a raised configuration in which the spare tire is elevated off of a road surface on which the vehicle rests and a lowered configuration in which the spare tire also rests on the road surface.

* * * * *